Sept. 19, 1961 A. J. ROSSI 3,000,497
SALT PURIFICATION, RECLAMATION AND TREATMENT PLANT
Filed July 16, 1958 3 Sheets-Sheet 1

Inventor
A. J. Rossi
By
Wenderoth, Lind & Ponack
Attorneys

Sept. 19, 1961 A. J. ROSSI 3,000,497
SALT PURIFICATION, RECLAMATION AND TREATMENT PLANT
Filed July 16, 1958 3 Sheets-Sheet 3

Inventor
A. J. Rossi
By
Wenderoth, Lind & Ponack
Attorneys

United States Patent Office 3,000,497
Patented Sept. 19, 1961

3,000,497
SALT PURIFICATION, RECLAMATION AND TREATMENT PLANT
Angelo J. Rossi, 6 Erith St., Mount Road Township, Port Elizabeth, Cape Province, Union of South Africa
Filed July 16, 1958, Ser. No. 748,918
Claims priority, application Union of South Africa June 16, 1957
10 Claims. (Cl. 209—17)

This invention relates to plant for purifying, reclaiming, washing, and treating granular materials, for example minerals.

It is an object of this invention to provide means for treating and cleaning contaminated salt for use in the treatment of hides and skins. It is a further object to provide means for cleaning sea sand for building purposes.

According to the invention, the granular material treatment plant includes a conical container having an overflow duct, an upper charging end and a lower discharging end, entraining flow conduit means having a branch cavity connected to the discharging end and leading into a transverse passage having a flow inlet and opposite it a flow outlet, and flow displacing means in the branch cavity.

Where the granular material is sea sand or a mineral requiring cleansing, then the rinsing liquor used in the plant for treating purposes is conveniently fresh water, but where the material to be treated is a soluble salt then the rinsing liquor is preferably a saturated solution of that salt.

Further features of the invention will become apparent from the following description of specific apparatus, particularly adapted to the cleansing and treatment of common salt for use in the treatment of hides and skins, as illustrated in the accompanying drawings, in which like reference numerals refer to like parts.

Figure 1:
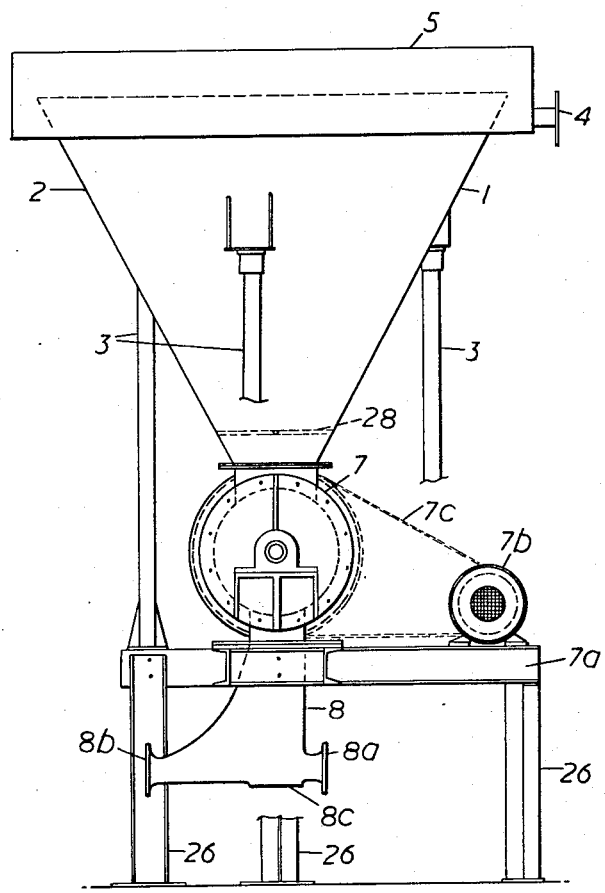
FIGURE 1 shows a side elevation of the flotation cone, rotary valve and boot.

In the specific apparatus for carrying out the method according to the invention, rinsing liquor containing means generally designated by reference numeral 1 comprises a hollow inverted cone 2 provided with supports 3 and with a draining outlet 4 and with an outer peripheral gutter 5 at its upper end for collecting floated contaminants, and provided with a pipe 4a for conducting such contaminants away and into a tilted settling tank, generally designated by reference numeral 6. The cone is further provided at its lower converging end with intermittently operating valve means comprising a motor-driven rotary valve 7. An entraining flow conduit means is provided in the form of a boot 8 which is substantially of T-shape in elevation and is provided with a downwardly converging granular material receiving passage connected to the rotary valve 7 and a transversely disposed delivery passage converging in the direction of flow of rinsing liquor from inlet 8a to outlet 8b. Solids pass from rotary valve 7 into the boot 8 connected at one end 8a to the outlet pipe 9 of a brine centrifugal pump 10, the outlet pipe 9 including a valve 9a, and at the other end 8b to a pipe 11 discharging on to a tilted screen 12 which is adapted to deliver solids on to discharge plate 13. A spray 14 is arranged over the screen and is adapted to receive fully clarified brine under pressure from centrifugal pump 10 through spray pipe 14a and spray pipe valve 14b. The pump 10 is driven by motor 10a. The boot 8 is further provided with a mud-hole and cover 8c at the bottom through which it may be cleaned of sediment periodically without disturbing connections.

The tilted screen 12 is arranged over the lower end 6a of the tilted settling tank, generally designated by reference numeral 6, over a special raised shallow receiving compartment 6b provided with an overflow 6c into the settling tank 6d. The lower portion of the main tank is further provided with a drain pipe 15 at the bottom of its lower end 6a through which the tank may be cleaned of sediment. The main tank is further provided with a conditioning agent box 16 at such a level that the contents may be maintained in contact with the brine. The tank is also provided with an upright baffle plate 17 which allows liquid passage under it, between it and the bottom plate 18 of the tank. At the upper end of the tank is another shallow compartment 6e with one lip 19 placed at such a height that the compartment may be filled by liquid from the main tank overflowing into it. This shallow compartment 6e is also the suction box because the suction 10b of the centrifugal pump 10 is connected to this compartment through pipe 20 and suction valve 21. The tank is provided with a fresh water inlet 22 through a valve 23 into the conditioning agent box 16 with an alternative fresh water inlet 24 through a ball valve 25 into the main tank.

Figure 2:
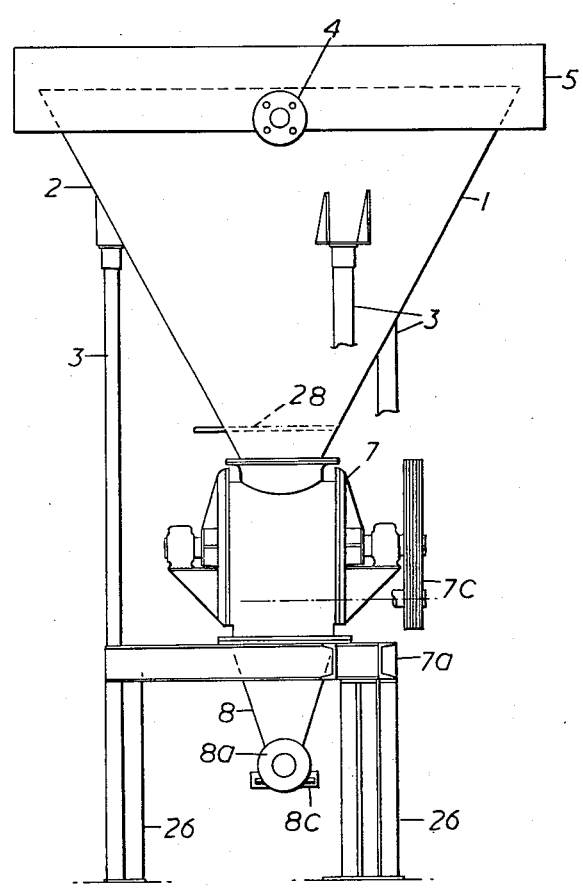
FIGURE 2 shows an end elevation of the plant shown in FIGURE 1, not showing the driving motor but merely the drive shaft, driving sprocket and motor centre line.
Figure 3:
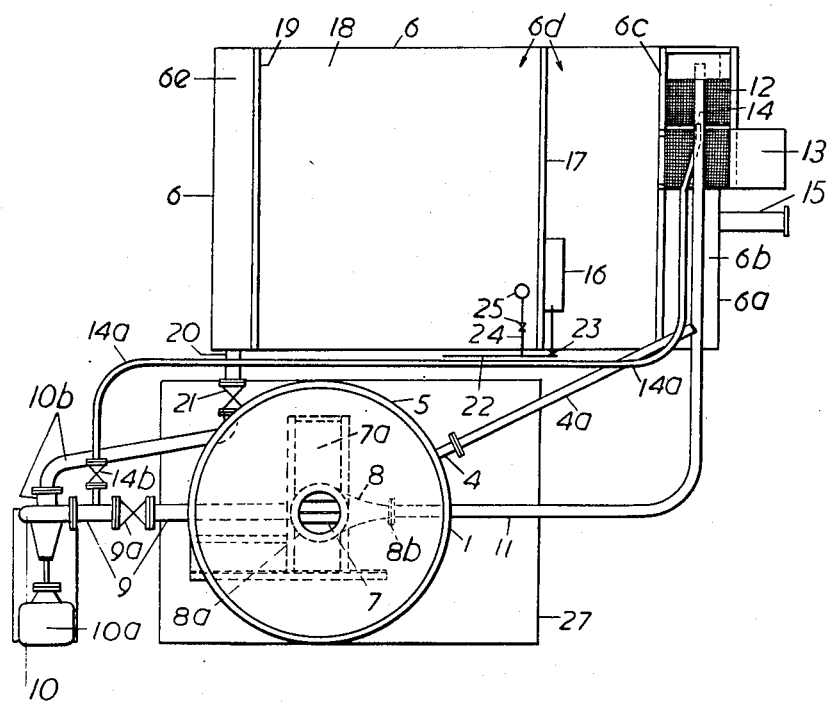
FIGURE 3 shows a plan view of the plant as a whole.

The rotary valve 7 is mounted on a framework 7a and is driven by a geared motor 7b (not shown in FIGURES 2 and 3 for the sake of clarity, the motor centre line and drive shaft and driving sprocket are shown merely in FIGURE 2) driving through chain drive 7c. The framework 7a is adapted to provide support to supports 3 of the cone 1, and the framework is itself supported by framework supports 26 in a pit 27. Reference numeral 28 refers to an annular aerating ring provided with twenty four circumferentially spaced 3 mm. diameter holes adapted to discharge air under a pressure of up to about 5 lb. per square inch gauge. The air bubbles are adapted to promote the flotation of contaminants.

In operation, the settling tank is charged with brine, where it comes into contact with the conditioning agents. The centrifugal pump is started which pumps the brine from the settling tank transversely through the boot below the flotation cone and up through the delivery pipe delivering it on to the upper end of the screen at the lower end of the settling tank. The pump also maintains a certain level of brine in the cone through the rotary valve, and the pump, together with the rotary valve when it is operating, maintains slight turbulence in the cone. The rotary valve rotates at a speed of between 12 to 24 r.p.m.

The salt to be purified is charged into the flotation cone where it comes into contact with the brine and with the conditioning agents in the brine. The turbulence in the cone causes some of the impurities to be floated off and to be collected in the gutter at the top of the cone and from there to be led off and delivered into the lower end of the settling tank. Particles of salt fall down to the bottom of the cone where it passes through the rotary valve into the boot below the cone. From there the salt particles are entrained and carried in the brine current and delivered on to the upper end of the inclined screen over the lower end of the settling tank. The particles of salt move down the screen under gravity and in their passage down the screen to discharge they are washed by the brine sprays under pressure from the brine pump. The cleansed salt is delivered on to the discharge plate ready for drying and use.

The brine passes through the screen and into the receiving compartment of the settling tank which overflows into the main settling tank. In the main settling tank a floculation action, induced by one or more conditioning agents, precipitates the remaining impurities. The delivery of brine takes place into the settling tank on one side of the baffle and it is on that side of the tank that the brine is brought into contact with the conditioning agents. The upper end of the settling tank is on the other side of the baffle and there the brine is in a comparatively undisturbed state and the brine overflows from this compartment of the settling tank into the suction box of the centrifugal pump.

If desired, further suitable conditioning agents added to the brine will cause the treated salt to have special properties such as improved taste or improved penetrating action into the hides with the result of improving the texture of the hides when finally tanned and to act as a sterilizing agent to fight against bacteria noxious to hides and skins.

What I claim is:

1. A granular material treatment plant comprising a conical container having an overflow duct, an upper charging end and a lower discharging end, entraining flow conduit means having downwardly converging side wall portions and front and rear wall portions together defining a branch cavity, the upper ends of said wall portions being connected to the discharging end of said conical container, a transverse conduit having a flow inlet and flow outlet and being convergent toward said flow outlet and to which the bottom ends of said wall portions are connected with said branch cavity opening into said transverse conduit, said rear wall portion curving smoothly downwardly and rearwardly from said conical container to said flow outlet, flow displacing means in said branch cavity, delivery pump means connected to said flow inlet, a tank and a screen over said tank, a first delivery pipe connected to the flow outlet of said entraining flow conduit means and ending over said screen, and a second delivery pipe connected to said delivery pump means and ending over said screen, said delivery pump means having a suction side connected to said tank.

2. A plant as claimed in claim 1 in which the flow displacing means includes a rotary valve operatively disposed in the branch cavity and operable to open and close cyclically.

3. A plant as claimed in claim 1 and an air discharge pipe in the said conical container near its lower discharging end, the pipe having perforations and a supply of air under pressure to which said air discharge pipe is connected.

4. A granular material treatment plant comprising a conical container having an overflow duct, an upper charging end and a lower discharging end, entraining flow conduit means having downwardly converging side wall portions and front and rear wall portions together defining a branch cavity, the upper ends of said wall portions being connected to the discharging end of said conical container, a transverse conduit having a flow inlet and flow outlet and being convergent toward said flow outlet and to which the bottom ends of said wall portions are connected with said branch cavity opening into said transverse conduit, said rear wall portion curving smoothly downwardly and rearwardly from said conical container to said flow outlet, a rotary valve in said branch cavity operable to open and close cyclically, delivery pump means connected to said flow inlet, a tank and a screen over said tank, a delivery pipe connected to the flow outlet of said entraining flow conduit means and ending over said screen, and said delivery pump means having a suction side connected to said tank.

5. A plant as claimed in claim 4 and an air discharge pipe in the said conical container near its lower discharging end, the pipe having perforations and a supply of air under pressure to which said air discharge pipe is connected.

6. A rinsing fluid and granular material counterflow means and flow entraining means for use in a granular material treatment plant, comprising a conical container having an overflow duct, an upper charging end and a lower discharging end, entraining flow conduit means having downwardly converging side wall portions and front and rear wall portions together defining a branch cavity, the upper ends of said wall portions being connected to the discharging end of said conical container, a transverse conduit having a flow inlet and flow outlet and being convergent toward said flow outlet and to which the bottom ends of said wall portions are connected with said branch cavity opening in to said transverse conduit, said rear wall portion curving smoothly downwardly and rearwardly from said conical container to said flow outlet, and flow displacing means in said branch cavity.

7. A plant as claimed in claim 6 in which the flow displacing means includes a rotary valve operatively disposed in the branch cavity and operable to open and close cyclically.

8. A plant as claimed in claim 6 and an air discharge pipe in the said conical container near its lower discharging end, the pipe having perforations and a supply of air under pressure to which said air discharge pipe is connected.

9. A rinsing fluid and granular material counterflow means and flow entraining means for use in a granular material treatment plant, comprising a conical container having an overflow duct, an upper charging end and a lower discharging end, entraining flow conduit means having downwardly converging side wall portions and front and rear wall portions together defining a branch cavity, the upper ends of said wall portions being connected to the discharging end of said conical container, a transverse conduit having a flow inlet and flow outlet and being convergent toward said flow outlet and to which the bottom ends of said wall portions are connected with said branch cavity opening into said transverse conduit, said rear wall portion curving smoothly downwardly and rearwardly from said conical container to said flow outlet, and a rotary valve in said branch cavity operable to open and close cyclically.

10. A plant as claimed in claim 9 and an air discharge pipe in the said conical container near its lower discharging end, the pipe having perforations and a supply of air under pressure to which said air discharge pipe is connected.

References Cited in the file of this patent

UNITED STATES PATENTS

| | | |
|---|---|---|
| 1,312,098 | Cerruti | Aug. 5, 1919 |
| 1,362,370 | Terry | Dec. 14, 1920 |
| 1,963,671 | Olney | June 19, 1934 |
| 2,431,984 | Bean | Dec. 2, 1947 |
| 2,591,043 | Berndt | Apr. 1, 1952 |
| 2,784,841 | Evans | Mar. 12, 1957 |

OTHER REFERENCES

"Handbook of Mineral Dressing," Taggart, sec. 18, page 102, 1945.